(12) United States Patent
Robert et al.

(10) Patent No.: US 9,205,810 B2
(45) Date of Patent: Dec. 8, 2015

(54) METHOD OF FOG AND RAINDROP DETECTION ON A WINDSCREEN AND DRIVING ASSISTANCE DEVICE

(75) Inventors: Caroline Robert, Paris (FR); Samia Ahiad, Gagny (FR); Xiyuan Zhang, Paris (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 450 days.

(21) Appl. No.: 13/582,648

(22) PCT Filed: Mar. 4, 2010
(Under 37 CFR 1.47)

(86) PCT No.: PCT/EP2010/001331
§ 371 (c)(1),
(2), (4) Date: Apr. 11, 2013

(87) PCT Pub. No.: WO2011/107116
PCT Pub. Date: Sep. 9, 2011

(65) Prior Publication Data
US 2013/0039544 A1  Feb. 14, 2013

(51) Int. Cl.
*G06K 9/00* (2006.01)
*B60S 1/08* (2006.01)

(52) U.S. Cl.
CPC ........... *B60S 1/0844* (2013.01); *G06K 9/00791* (2013.01)

(58) Field of Classification Search
CPC ................................ B60S 1/0844; B60S 1/08
See application file for complete search history.

(56) References Cited

U.S. PATENT DOCUMENTS

| | | | |
|---|---|---|---|
| 5,313,072 A * | 5/1994 | Vachss | 250/573 |
| 6,313,454 B1 * | 11/2001 | Bos et al. | 250/208.1 |
| 6,587,573 B1 * | 7/2003 | Stam et al. | 382/104 |
| 8,572,891 B2 * | 11/2013 | Pribisic | 49/28 |
| 8,688,330 B2 * | 4/2014 | Werner et al. | 701/49 |
| 2001/0042822 A1 * | 11/2001 | Hochstein | 250/227.25 |
| 2005/0206511 A1 | 9/2005 | Heenan et al. | |
| 2006/0065821 A1 | 3/2006 | Stam et al. | |
| 2008/0234895 A1 * | 9/2008 | Veerasamy | 701/36 |

FOREIGN PATENT DOCUMENTS

| | | |
|---|---|---|
| EP | 1 418 089 A2 | 5/2004 |
| EP | 1 790 541 A2 | 5/2007 |

OTHER PUBLICATIONS

International Search Report from PCT/EP2010/001331 mailed Oct. 29, 2010 (3 pages).
Written Opinion from PCT/EP2010/001331 mailed Oct. 29, 2010 (4 pages).

* cited by examiner

*Primary Examiner* — Shefali Goradia
(74) *Attorney, Agent, or Firm* — Osha Liang LLP

(57) ABSTRACT

The invention relates to a method of fog and raindrop detection on a windscreen (200), comprising a raindrop detection application (201) and a fog detection application (202), characterized in that said fog detection application (202) comprises a step (202b) in which an indication of the presence of raindrop is detected, said indication of raindrop presence triggering a switch from said fog detection application (202) to said raindrop detection application (201).

13 Claims, 4 Drawing Sheets

Figure 1:
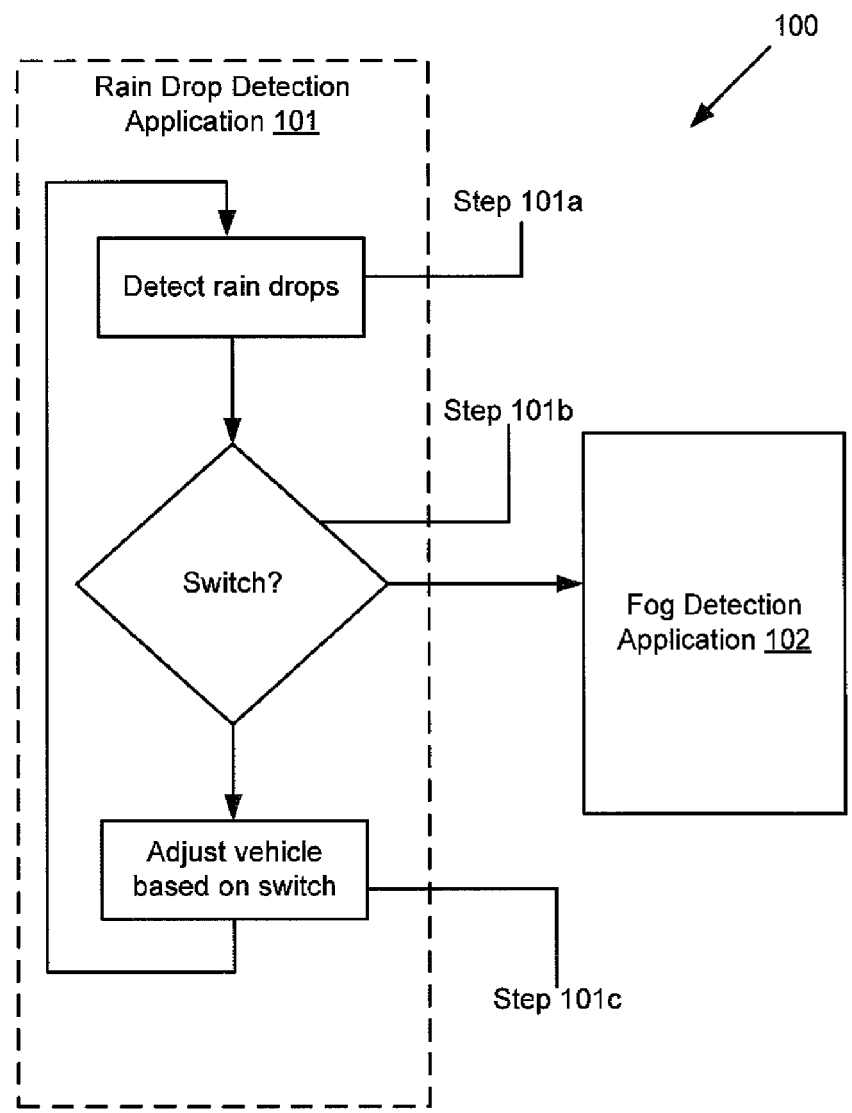

METHOD OF FOG AND RAINDROP DETECTION ON A WINDSCREEN AND DRIVING ASSISTANCE DEVICE

The invention relates to a method and a system for detecting the presence of rain and fog on the windscreen of a motor vehicle, by processing images, particularly in order to automatically trigger the activation of a vehicle's device such as windscreen wipers and/or defroster or defogging system.

In motor vehicles, several driving assistance systems are known, using images captured by a single or by several cameras.

The images obtained can be processed to allow a display on screens, for example at the dashboard or projected on the windscreen, in particular to alert the driver in the case of danger or simply to improve his visibility. The images can also make it possible to detect raindrop or fog on the windscreen.

These images can participate in the automatic triggering of a functionality of the vehicle (alert to the driver, automatic triggering of braking, automatic triggering of the windscreen wipers in the case of the display of drops of water on the windscreen, visual or audible warning, control of certain functions of the headlight, etc).

In the particular case of weather detection, raindrop and fog are usually detected with two different detection's applications. Fog detection application is done in alternate processing cycles with raindrop detection application. In particular, many cycles may be used for raindrop detection between fog detection cycles due to the slow onset of windscreen fogging.

Therefore, each camera's weather application needs its own dedicated application, running cyclically or simultaneously, which requires significant resources.

An object of the invention is therefore to overcome this drawback by proposing an improved method and an improved associated driving assistance device for detecting fog and raindrop on a windscreen.

In a first aspect of the present invention, this object is achieved by a method of fog and raindrop detection on a windscreen, comprising a raindrop detection application and a fog detection application, characterized in that said raindrop detection application comprises a step in which the lack of raindrop triggers a switch from said raindrop detection application to said fog detection application.

According to a further aspect, the raindrop detection application switches to the fog detection application when the raindrop number and/or the water surface, remains equal or bellow a predetermined first threshold during a predetermined time.

The invention also relates to a method of fog and raindrop detection on a windscreen, comprising a raindrop detection application and a fog detection application, characterized in that said fog detection application comprises a step in which an indication of the presence of raindrop is detected, said indication of raindrop presence triggering a switch from said fog detection application to said raindrop detection application.

According to another aspect, said method of fog and raindrop detection uses a camera which is focused at infinite to capture images, and the fog detection application comprises the following stages:
  a first stage in which edges are detected within an area of interest in the captured images,
  a second stage in which a luminance curve is evaluated from the pixels of said area of interest,
  a third stage in which an inflexion point is calculated from said luminance curve to determine the visibility distance.

For example, the fog detection application triggers a switch from said fog detection application to said raindrop detection application when the number of edges width supposed corresponding to raindrop shape (or raindrop edges) is higher than a predetermined second threshold.

According to another aspect, the raindrop detection application comprises a step in which the lack of raindrop triggers a switch from said raindrop detection application to the fog detection application and the fog detection application comprises a step in which an indication of the presence of raindrop is detected, said indication of raindrop presence triggering a switch from said fog detection application to said raindrop detection application.

This third example allows a rapid switch between fog and rain detection application. For example, in case of accidental drops on windscreen during fog condition weather, fog detection application detects drops and switch in rain detection application. Then, rain detection application launches wiping and after wiping, rain detection application switches again into fog detection application.

Those methods use the fact that rain and fog are climatic conditions that couldn't occur simultaneously. Indeed, rain and fog result of different levels of atmospheric pressure. Very small rain could appear simultaneously as fog but this exceptional and particular adverse weather condition is considered as rain to allow a wiping of the windscreen. Thus, rain and fog are mutually exclusive and there is no need to run both detections simultaneously. Automating the transition from one to the other would reduce the resources needed to operate the camera.

According to a further aspect, said method of fog and raindrop detection uses a camera comprising a bifocal objective, and the fog detection application uses images portions captured by said camera in a first zone that is focused to infinity to detect fog density and the raindrop detection application uses images portions captured by said camera in a second zone that is focused on the windscreen to detect raindrop.

Fog detection application may also detect edges in the captured images by said camera in said second zone that is focused on the windscreen, to detect an indication of the presence of raindrop edges, the fog detection application switches to the raindrop detection application when the supposed raindrop edges number in said second zone is higher than said second predetermined threshold.

As an example, the raindrop detection application comprises the following steps:
  a first step to detect raindrop using images portions captured in said second zone, and
  a second step in which the lack of raindrop triggers a switch from said raindrop detection application to the fog detection application,
and the fog detection application comprises the following steps:
  a first step in which edges are detected within
    a first area of interest selected in said first zone to detect fog density, and
    a second area of interest selected in said second zone to detect the presence of supposed raindrop edges, and
  a second step in which the exceed of the supposed raindrop edges number beyond said predetermined second threshold, triggers a switch from said fog detection application to said raindrop detection application.

According to a further object, the invention relates to a driving assistance device comprising:
- a camera for being mounted onboard a vehicle, and
- processing means configured to capture images from said camera,
- characterized in that said processing means are configured to implement said method of fog and raindrop detection on a windscreen.

According to another aspect, said camera comprises a bifocal objective providing a first zone that is focused to infinity and a second zone focused in near field.

Said processing means may also be configured to run Lane Departure Warning, Speed Limit Assist or Adaptative Driving Beam driving assistance applications using images from a single camera.

The camera of the driving assistance device is thus multi-function. The driving assistance device can be used to detect raindrop on a windscreen or to capture images of scenes of the road through the windscreen. It is therefore possible to share the same camera for multiple functions, by virtue of a modified objective.

Other features and advantages of the invention will become apparent from the following description of a non-limiting example, and enclosed drawings.

Figure 2:
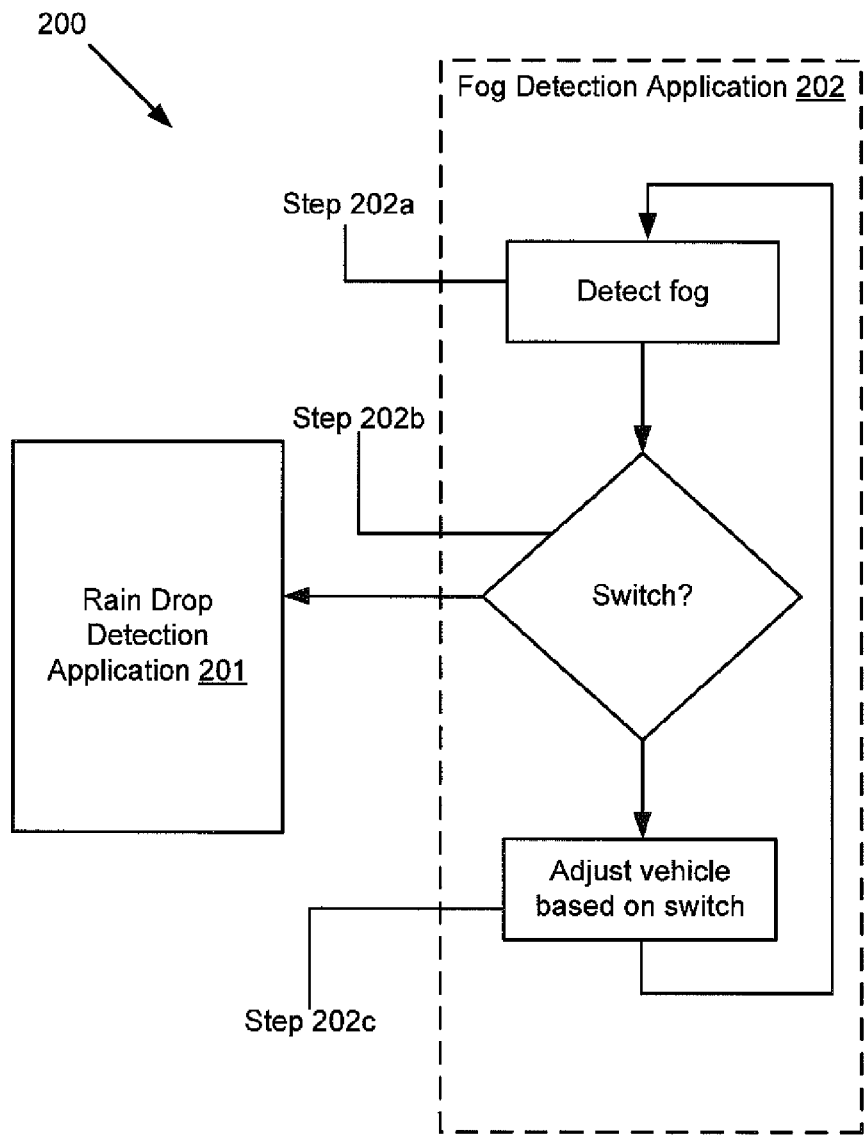
Figure 3:
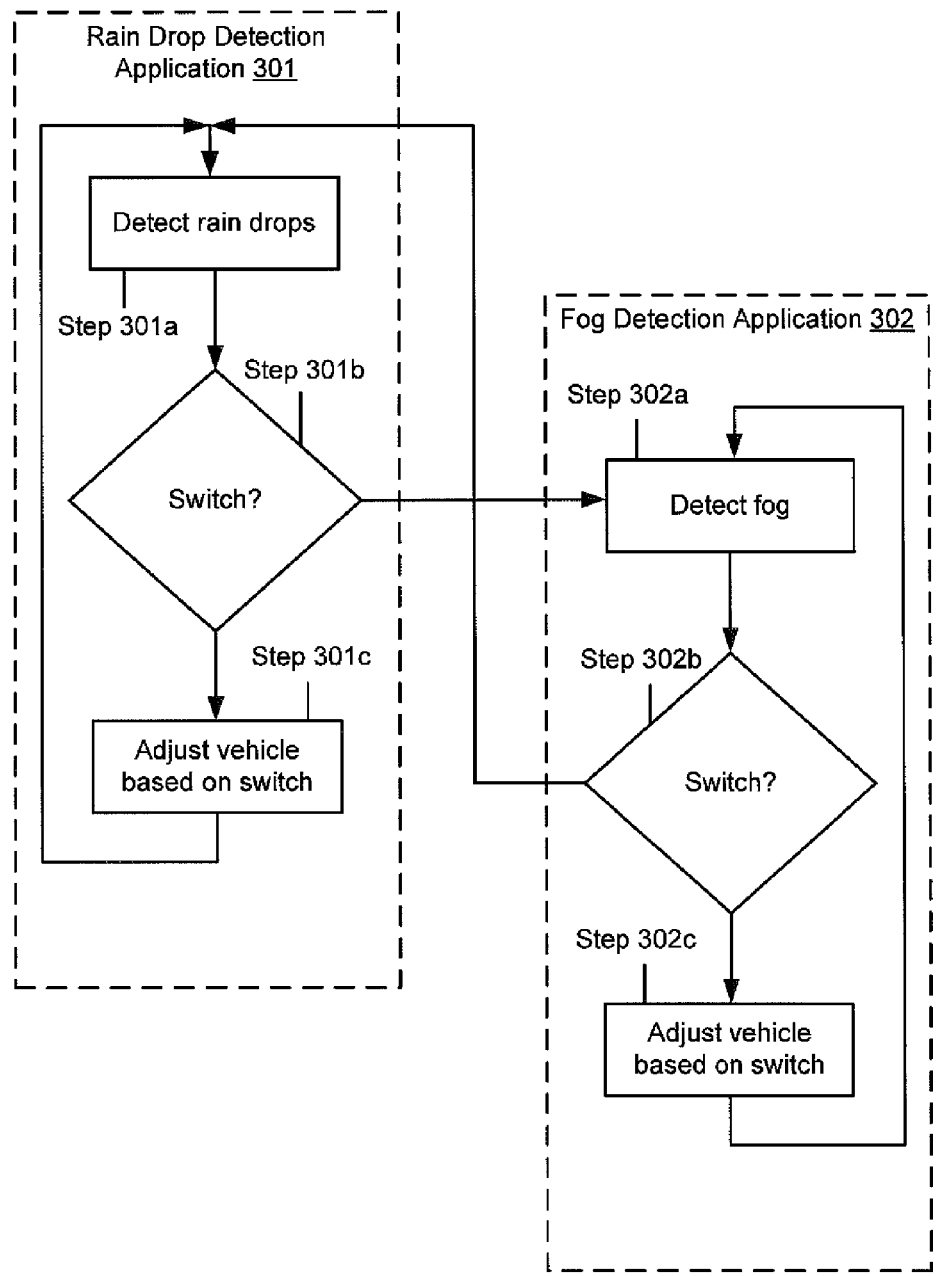
Figure 4:
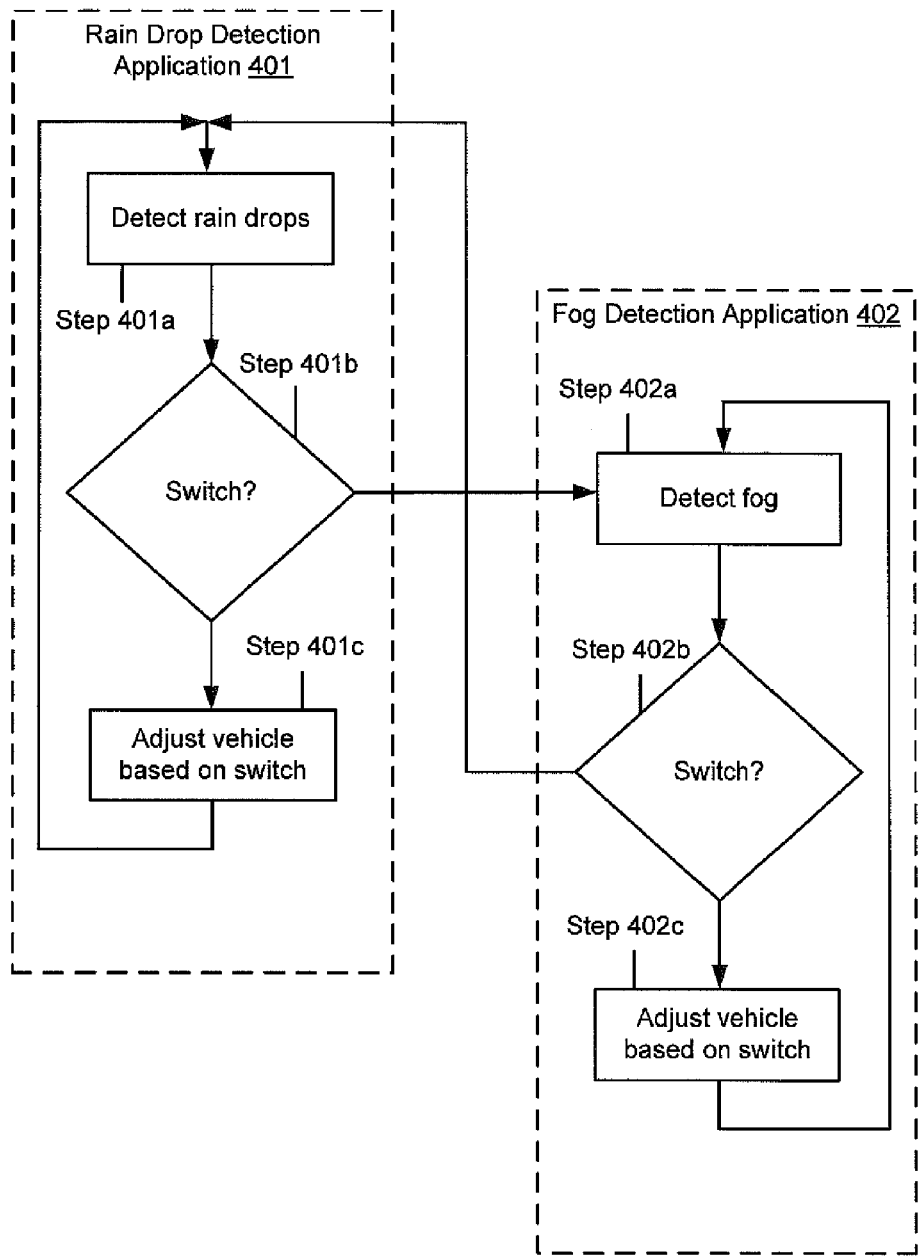

For a better understanding of the invention with regard to the embodiments thereof, reference is made to the accompanying drawings, in which like numerals designate corresponding elements or sections throughout, and in which:

FIG. 1 is a flowchart of a first example of a method of fog and raindrop detection on a windscreen, FIG. 2 is a flowchart of a second example of a fog and raindrop detection method, FIG. 3 is a flowchart of a third example of a fog and raindrop detection method, and FIG. 4 is a flowchart of a fourth example of a method of detecting fog and raindrop.

The driving assistance device comprises a camera mounted onboard a motor vehicle.

As used herein, the term "camera" is used to designate any device for acquiring images of the camera type (more particularly the CCD ("charge coupling sensor"s) or CMOS (Complementary Metal Oxide Semiconductor) type) or photosensitive sensor, for example a black and white sensor or a color sensor.

The camera is installed in the cab interior of the vehicle, opposite a "wipable" zone of a windscreen, that is to say a zone which is swept by one of the wiper blades while in operation. The camera takes successive images of the road in front of the vehicle through the windscreen. For example, the camera is mounted behind the windscreen wiped area, at approximately ten to twenty centimeters from it.

The camera supplies signals representing images that can then be processed. The camera is generally sensitive in the visible range and/or in the infrared range, in particular in the near infrared.

The driving assistance device also comprises processing means configured to capture images from said camera and then, to implement a method of fog and raindrop detection on a windscreen on the captured images in order to automatically control the vehicle appropriated devices. For example, the vehicle's devices are the windscreen wipers, defroster and/or defogging systems.

The rain and fog detection method comprises distinct raindrop and fog detection applications; both applications comprising different algorithms and running separately.

An example of a fog and raindrop detection method 100 is illustrated in FIG. 1.

According this first example, the raindrop detection application 101 of the fog and raindrop detection method 100 comprises:
- a first step 101a to detect raindrop,
- a second step 101b in which the lack of raindrop triggers a switch from said raindrop detection application 101 to the fog detection application 102, and
- a third step 101c to automatically control a vehicle's device associated to the raindrop detection.

The raindrop detection 101a uses classical robust method of rain detection with for example, the determination of edges in an area of interest and a serial of tests to reject edges that are not raindrop edges and correspond to other obscurating objects such as lamps or lanes.

For example, the raindrop detection first step 101a evaluates the raindrop number and/or the water surface on images acquired by the camera on the windscreen. Thereby, the second step 101b triggers the switch into the fog detection application 102 when the raindrop number and/or the water surface, remains equal or bellow a predetermined first threshold, for example remains equal to zero, during a predetermined time.

In contrary, the presence of raindrop keeps the raindrop detection application 101 running.

After raindrop has been detected, an appropriate treatment in real time can be carried out on the vehicle (third step 101c). For example, the raindrop detection application 101 adapts the velocity and the cycle of the vehicle's wipers.

FIG. 2 illustrates an example of fog detection application 202 which comprises:
- a first step 202a to detect fog,
- a second step 202b in which raindrop is detected, the presence of raindrop triggers a switch from said fog detection application 202 to said raindrop detection application 201, and a second step 202b in which an indication of the presence of raindrop is detected, said indication of raindrop presence triggers a switch from said fog detection application 202 to said raindrop detection application 201,
- a third step 202c to automatically control a vehicle's device associated to the fog detection.

An indication of the presence of raindrop corresponds to a strong supposition of raindrop presence. However, the fog detection application 202 is not sufficiently robust to confirm this supposed raindrop presence. This indication has to be confirmed by the raindrop detection application 201. If the raindrop detection application 201 invalidates the raindrop presence then the raindrop detection application 201 switches again to the fog detection application 202 and the indication of raindrop presence is then ignored.

For example, the fog detection application 202 uses a camera which is focused at infinite to capture images, in order to be able, with sufficient clarity, to capture elements, which are external to the vehicle and located at least 20 meters from the latter.

The first step 202a to detect fog comprises the following stages.

In a first stage, edges are detected within an area of interest selected in the captured images. In non-limiting examples, edge detection methods such as the Sobel, Prewitt, Roberts, Zero-cross, Canny methods etc. can be used. The edge detection allows removing the non-homogenous zones of the area of interest. These non-homogenous zones generally reflect the presence of an object such as a tree, a vehicle, a line of road markings, a lamp etc. The pixels belonging to theses edges are then remove on next steps. The area of interest is then a homogeneous region in which are excluded: noise, parasites; and non-homogeneous objects.

In a second stage, a luminance (or grayscale) curve is evaluated from the pixels of said area of interest, for example in a vertical line of said area of interest. This luminance curve has an approximately S-shape.

And in a third stage, an inflexion point is calculated from said luminance curve to determine the visibility distance, that is to say the distance up to which the driver of the vehicle can perceive any obstacles in the road scene. The inflexion point corresponds to the second derivative of the luminance curve.

The calculation of the visibility distance thus can provide better information about the fog density.

The calculation of the visibility distance can be based on the Koschmieder's law, which provides a simple expression of the luminance of an object observed at a distance d:

$$L=L0*\exp(-kd)+Lh(1-\exp(-kd))$$

where
L0 is the intrinsic luminance of the object,
k is the coefficient of extinction of the fog, and
Lh is the luminance of the ambient fog caused by the many diffusions of the light in the atmosphere.

In the step 202b of determining the triggering of switch into the raindrop detection application 201, an evaluation of the presence of raindrop is determinated.

With said camera focused at infinite, the fog detection application may trigger a switch from said fog detection application to said raindrop detection application when the number of edges width supposed corresponding to raindrop shape is higher than a second predetermined threshold.

For example, the fog detection application comprises the following stages:
a first stage of measuring the width of edges previously detected,
a second stage of realizing an edges widths histogram, this second stage will enable the edges supposed corresponding to raindrop on the windscreen to be distinguished from the other edges of the images, and
a third stage of thresholding, beyond a given minimum predetermined third threshold, the edges widths, more particularly in order to reinforce the presumption of the presence of edges likely to correspond to droplets on the windscreen, to trigger the switch to the raindrop detection application when the number of the edges width is higher than a predetermined second threshold.

Indeed, a spot corresponding to a droplet of water on the windscreen could be distinguished from other spots (corresponding for example to an object of the landscape outside the vehicle) due to its width of edge. The droplets of water on a windscreen indeed present an edge, which is relatively wider than other spots. Establishing a histogram of these widths of edge makes it possible to select the edge points supposed corresponding to the droplets.

The lack of raindrop detection keeps the fog detection application 202 running.

If fog has been detected, an appropriate treatment in real time can be carried out on the vehicle (third step 202c). For example, the application can activate the fog lamps at the front and at the rear of the vehicle or send an alert signal to the driver of the vehicle advising him to reduce his speed relative to a maximum authorized speed or relative to a distance for stopping the vehicle.

In contrary, the presence of raindrop triggers the switch from the fog detection application 202 to the raindrop detection application 201.

According to a third example of fog and raindrop detection method 300 illustrated in FIG. 3, the raindrop detection application 301 comprises a step 301b in which the lack of raindrop triggers a switch from the raindrop detection application 301 to the fog detection application 302 and likewise, the fog detection application 302 comprises a step 302b in which an indication of the presence of raindrop triggers a switch from the fog detection application 302 to the raindrop detection application 301.

This third example allows a rapid switch between fog and rain detection application 301, 302. For example, in case of accidental drops on windscreen during fog condition weather, fog detection application 302 detects drops and switch in rain detection application 301. Then, rain detection application 301 launches wiping and after wiping, rain detection application 301 switches again into fog detection application 302.

The raindrop detection application 301 and the fog detection application 302 of this third example may combine the raindrop and fog detection applications 101, 102, 201, 202 previously described.

Those methods 100, 200, 300 use the fact that rain and fog are climatic conditions that couldn't occur simultaneously. Indeed, rain and fog result of different levels of atmospheric pressure. Very small rain could appear simultaneously as fog but this exceptional and particular adverse weather condition is considered as rain to allow a wiping of the windscreen. Thus, rain and fog are mutually exclusive and there is no need to run both applications simultaneously. Automating the transition from one to the other would reduce the resources needed to operate the camera.

According to a first embodiment of the driving assistance device, the camera comprises a bifocal (or multi-focal) objective providing a first zone that is focused to infinity and a second zone focused in near field. "Near field" relates to a distance of around a centimeter or a few tens of centimeters (corresponding for example to a normal distance between camera and wiped windscreen area in the vehicle).

It is thus possible to capture images in the distance with the adapted focal distance, and close by with a shorter focal distance.

Therefore fog detection method 102, 202, 302, and methods of detecting lane edges or road verges, or detecting pedestrians or obstacles, will be able to use the portions of images captured at distance by the sensor, sufficiently sharp by virtue of the zone of the objective focused to infinity and the method of raindrop detection 101, 201, 301 will be able to use the portions of images taken at a very short distance, on the windscreen, through the zone of the objective focused on the windscreen.

Furthermore, processing means can be configured to run other driving assistance methods using video images from said single camera.

For example, processing means are configured to run Lane Departure Warning application ("LDW") which alerts drivers of an unintended movement of the vehicle out of a designated traffic lane. In another example, processing means are configured to run Speed Limit Assist application (or "SLA"). The processing mean detects the speed limit signs as the vehicle past them, and reminds the driver of the current speed limit and, in doing so, help them to be safer on the road. In a further example, processing means are configured to run Adaptative Driving Beam application (or "BeamAtic") which allows the automatic switching between high and low beams for example as soon as another vehicle approaches.

The camera of the driving assistance device is thus multi-function. The driving assistance device can be used to detect raindrop on a windscreen or to capture of images of scenes of the road through the windscreen of the vehicle. It is therefore possible to share the same camera for multiple functions, by virtue of a modified objective.

According to this embodiment, the fog detection application 102, 202, 302 may use images portions captured in a first zone 2 that is focused to infinity to detect fog density and the raindrop detection application 101, 201, 301 may use images portions captured in a second zone 3 that is focused on the windscreen to detect raindrop. There is thus no longer any obligation to have a sensor dedicated to the detection of rain.

Fog detection application 102, 202, 302 may also detect edges in the captured images by the camera in the second zone that is focused on the windscreen, to detect the presence of supposed raindrop edges, the fog detection application switches to the raindrop detection application when the supposed raindrop edges number in said second zone is higher than the predetermined second threshold.

FIG. 4 illustrates an example of embodiment of the method of raindrop and fog detection 400. According this example, the raindrop detection application 401 comprises:
- a first step 401a to detect raindrop uses images portions captured by the camera in a second zone that is focused on the windscreen,
- a second step 401b in which the lack of raindrop triggers a switch from said raindrop detection application 401 to the fog detection application 402, for example when the raindrop number and/or the water surface, remains equal or bellow the predetermined first threshold during a predetermined time, and
- a third step 401c to automatically control a vehicle's device associated to the raindrop detection.

The fog detection application 402 comprises:
- a first step 402a in which edges are detected within a first area of interest selected in the captured images by the camera in the first zone that is focused to infinity to detect fog density and in which edges are also detected within a second area of interest selected in the captured images by the camera in the second zone that is focused on the windscreen, to detect an indication of the presence of raindrop edges,
- a second step 402b in which the exceeding of the raindrop edges number in the second zone beyond a predetermined second threshold, triggers a switch from said fog detection application 402 to said raindrop detection application 401, and
- a third step 402c in which a luminance curve is evaluated from the pixels of the first area of interest and in which an inflexion point is calculated from said luminance curve to determine the visibility distance and automatically control a vehicle's device associated to the fog detection if fog has been detected.

Therefore, fog and raindrop detection applications don't run simultaneously, requiring fewer resources.

The invention claimed is:

1. A method of fog and raindrop detection on a windscreen, comprising:
   detecting, by a raindrop detection application, raindrops on the windscreen; and
   detecting, by a fog detection application, fog on the windscreen,
   wherein a lack of detection of raindrops by the raindrop detection application triggers a switch from operation of said raindrop detection application to operating of said fog detection application,
   wherein the raindrop detection application to the fog detection application when a number of raindrops and/or a water surface remains equal or below a predetermined first threshold during a predetermined time.

2. The method of fog and raindrop detection according to claim 1, further comprising:
   using a camera comprising a bifocal objective,
   wherein the fog detection application uses image portions captured by said camera in a first zone that is focused to infinity to detect fog density, and wherein the raindrop detection application uses image portions captured by said camera in a second zone that is focused on the windscreen to detect raindrop.

3. The method of fog and raindrop detection according to claim 2, wherein said fog detection application also detects edges in the captured images by said camera in the second zone that is focused on the windscreen, to detect an indication of the presence of raindrop edges, and wherein the fog detection application switches to the raindrop detection application when a number of supposed raindrop edges in said second zone is higher than said second predetermined threshold.

4. The method of fog and raindrop detection according to claim 3,
   wherein the raindrop detection application comprises:
      a first step to detect raindrop using images portions captured in said second zone, and
      a second step in which the lack of raindrop triggers a switch from said raindrop detection application to the fog detection application,
   wherein the fog detection application comprises:
      a first step in which edges are detected within a first area of interest selected in said first zone to detect fog density, and a second area of interest selected in said second zone to detect the presence of supposed raindrop edges, and
      a second step in which an excess of a number of said supposed raindrop edges in said second zone beyond said predetermined second threshold triggers a switch from said fog detection application to said raindrop detection application.

5. The method of fog and raindrop detection according to claim 1, wherein said fog detection application comprises detecting an indication of the presence of raindrops, said indication of raindrop presence triggering a switch from operation of said fog detection application to operation of said raindrop detection application.

6. A system for fog and raindrop detection on a windscreen, comprising:
   a raindrop detection application configured to detect raindrops on the windscreen; and
   a fog detection application configured to detect fog on the windscreen,
   wherein said fog detection application comprises detecting an indication of a presence of raindrops, said indication of raindrop presence triggering a switch from operation of said fog detection application to operation of said raindrop detection application,
   wherein the raindrop detection application switches to the fog detection application when a number of raindrops and/or a water surface remains equal or below a predetermined first threshold during a predetermined time.

7. The system for fog and raindrop detection according to claim 6, further comprising:
   a camera which is focused at infinite to capture images,
   wherein the fog detection application comprises:
      a first stage in which edges are detected within an area of interest in the captured images,
      a second stage in which a luminance curve is evaluated from the pixels of said area of interest, and a third stage in which an inflexion point is calculated from said luminance curve to determine the visibility distance.

8. The system for fog and raindrop detection according to claim 7, wherein a switch from operation of the fog detection application to operation of said raindrop detection application is triggered when a detected number of edges corresponding to a raindrop shape is higher than a predetermined second threshold.

9. The system for fog and raindrop detection according to claim 6, wherein said raindrop detection application is configured to trigger a switch from operation of the raindrop detection application to operation of the fog detection application based on lack of detection of raindrops.

10. The system for fog and raindrop detection according to claim 6, further comprising:
   using a camera comprising a bifocal objective,
   wherein the fog detection application uses image portions captured by said camera in a first zone that is focused to infinity to detect fog density, and wherein the raindrop detection application uses image portions captured by said camera in a second zone that is focused on the windscreen to detect raindrop.

11. A driving assistance device comprising:
a camera for being mounted onboard a vehicle; and
a computer processor configured to:
   capture images from said camera,
   detect, by a raindrop detection application, raindrops on the windscreen; and
   detecting, by a fog detection application, fog on the windscreen,
wherein a lack of detection of raindrops by the raindrop detection application triggers a switch from operation of said raindrop detection application to operating of said fog detection application,
wherein the raindrop detection application switches to the fog detection application when a number of raindrops and/or a water surface remains equal or below a predetermined first threshold during a predetermined time.

12. The driving assistance device according to claim 11, wherein said camera comprises a bifocal objective providing a first zone that is focused to infinity and a second zone focused in near field.

13. The driving assistance device according to claim 12, wherein the computer processor is further configured to run Lane Departure Warning, Speed Limit Assist or Adaptative Driving Beam driving assistance applications using images from a single camera.

* * * * *